(No Model.)

I. C. PRATT.
ANIMAL TRAP.

No. 549,293. Patented Nov. 5, 1895.

Witnesses.
C. D. Howarth
J. H. Howarth

Inventor.
Ira C. Pratt

UNITED STATES PATENT OFFICE.

IRA C. PRATT, OF CROPSEY, ILLINOIS.

ANIMAL-TRAP.

SPECIFICATION forming part of Letters Patent No. 549,293, dated November 5, 1895.

Application filed June 7, 1895. Serial No. 551,960. (No model.)

*To all whom it may concern:*

Be it known that I, IRA C. PRATT, a citizen of the United States, residing at Cropsey, in the county of McLean and State of Illinois, have invented a new and useful Improvement in Animal-Traps, of which the following is a specification, reference being had to the accompanying drawings, in which—

Figure 1:
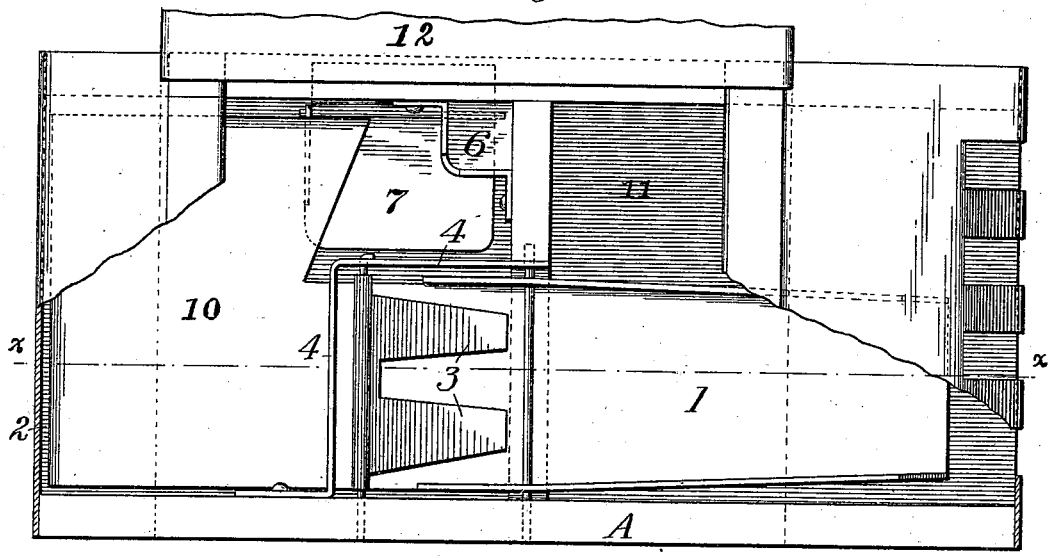
Figure 2:
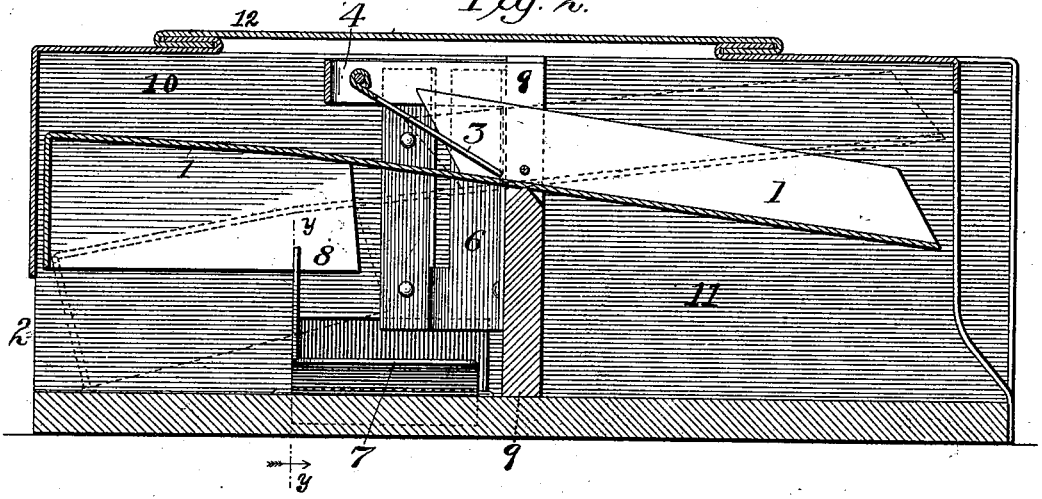

Figure 1 is a plan view, partly in section, of the said trap; Fig. 2, a vertical section of the same on the line $x\ x$, Fig. 1; and Fig. 3 a detailed elevation of the detent on line $y\ y$, Fig. 2.

The object of my invention is to provide a trap which shall be more reliable in its action and more certain to retain any animal entering it than similar traps now in use. I accomplish this by means of a rectangular box having two chambers, in combination with a tilting platform adapted to gravitate to a position which closes the entrance to the trap. The invention also consists in part of a detent adapted to gravitate to a position to automatically engage the tilting platform and hold the same in the position required to set the trap.

The partition 9 separates the entrance-chamber 10 from the retaining-chamber 11. An opening 2, through which a mouse or other animal may enter the chamber 10, is clearly shown in the drawings, and also a bait-cage 6 in one corner of chamber 10. The retaining-chamber 11 is bounded by the top, bottom, sides, and one end of the box, in combination with partition 9. The end of the box referred to may be grated or formed of bars, as shown by the drawings.

The top of the box consists in part of a sliding cover 12 to permit access to the interior of the trap.

A tilting platform 1 is pivoted near its middle and above partition 9, which is cut away at one side of its upper end, as shown in Fig. 2.

Platform 1 is adapted to gravitate to the position shown in dotted lines in Fig. 2, and in this position it completely closes opening 2, as one end of the platform is bent downward for that purpose. The end of the platform in chamber 10 is nearly as wide as the chamber, except as it is cut away in the vicinity of bait-cage 6, (see Fig. 1,) and is bent downward not only at the end, as described, but also at the side adjacent to detent 7, (see 8, Fig. 2,) to adapt it to be engaged by the notched upper end of the detent.

Figure 3:
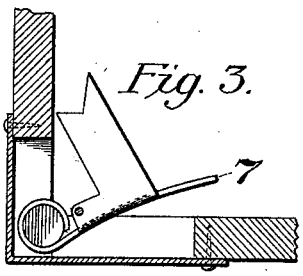

Detent 7 is angled and pivoted near its middle to one side of chamber 10, the walls of the chamber being recessed or cut away to provide room for the bearings, as indicated in Fig. 3. The broad horizontal arm of the detent projects from the side of the chamber near bait-cage 6, and is adapted to be depressed by the weight of an animal stepping upon it while trying to reach the bait in cage 6. The vertical arm is narrower, is notched at its upper end, and its form, as shown in Fig. 3, is such as to adapt it to engage the downward-turned edge 8 of platform 1. The detent is pivoted in such a manner as to gravitate to a position which brings its notched upper end under the downward-bent edge of the platform.

A bent vertical partition 4 extends downward from near the top of the trap, and in one part overhangs the cut-away portion of platform 1, all of which is clearly shown in Fig. 1. The lower edge of the overhanging part of partition may also be cut away. This construction provides an exit from chamber 10 to the upper side of platform 1, along which a passage through and under drop-door 3 toward the end of the platform is permitted. One or both edges of the platform along this passage-way may be bent upward to prevent escape into chamber 11 from the sides of the platform.

The action of the device is as follows: A mouse or other animal, attracted by the bait in cage 6, enters chamber 10, releases detent 7, and, alarmed by the descent of the platform 1, can only escape from the entrance-chamber by passing to the upper side of the platform, thence along the platform under drop-door 3 toward the end of the platform until the tilting of the platform permits escape between the end of the platform and end of the trap into the retaining-chamber 11; but the tilting of the platform brings it to approximately its initial position, which permits the upper end of detent 7 to pass under the edge of the platform, resulting in the resetting of the trap.

Having thus described my invention, what

I claim as new, and desire to secure by Letters Patent, is—

In an animal trap having two chambers, the combination of a tilting platform 1, having one end and a part of one side bent downward as described, a detent 7 angled and pivoted near its middle and adapted to gravitate to a position which permits it to automatically engage the downward bent edge of the platform 1, a bent partition 4, a drop door 3, and a bait cage 6, all substantially as described and for the purposes hereinbefore specified.

IRA C. PRATT.

Witnesses:
 C. D. HOWARTH,
 J. H. HOWARTH.